United States Patent
Bhogal et al.

(10) Patent No.: US 8,988,421 B2
(45) Date of Patent: Mar. 24, 2015

(54) RENDERING AVATAR DETAILS

(75) Inventors: Kulvir S. Bhogal, Fort Worth, TX (US); Rick A. Hamilton, II, Charlottesville, VA (US); Brian M. O'Connell, Cary, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 12/326,221

(22) Filed: Dec. 2, 2008

(65) Prior Publication Data

US 2010/0134485 A1    Jun. 3, 2010

(51) Int. Cl.
*G06T 15/00* (2011.01)
*A63F 13/40* (2014.01)
*G06Q 10/10* (2012.01)

(52) U.S. Cl.
CPC .............. *G06T 15/00* (2013.01); *A63F 13/10* (2013.01); *G06Q 10/10* (2013.01); *A63F 2300/558* (2013.01); *A63F 2300/66* (2013.01); *A63F 2300/663* (2013.01)
USPC ........................................................ 345/419

(58) Field of Classification Search
None
See application file for complete search history.

(56) References Cited

U.S. PATENT DOCUMENTS

| | | | |
|---|---|---|---|
| 6,072,498 A * | 6/2000 | Brittain et al. | 345/428 |
| 6,118,456 A * | 9/2000 | Cooper | 345/619 |
| 6,119,147 A * | 9/2000 | Toomey et al. | 709/204 |
| 6,329,986 B1 * | 12/2001 | Cheng | 345/419 |
| 6,559,863 B1 * | 5/2003 | Megiddo | 715/753 |
| 6,934,747 B1 * | 8/2005 | McGrath et al. | 709/224 |
| 7,231,205 B2 * | 6/2007 | Guyot et al. | 455/414.1 |
| 7,310,676 B2 * | 12/2007 | Bourne | 709/227 |
| 8,136,038 B2 * | 3/2012 | Ross et al. | 715/706 |
| 2002/0109719 A1 * | 8/2002 | Hata et al. | 345/748 |
| 2002/0135581 A1 | 9/2002 | Russell et al. | |
| 2003/0156134 A1 * | 8/2003 | Kim | 345/753 |
| 2006/0028475 A1 * | 2/2006 | Tobias | 345/473 |
| 2007/0120969 A1 * | 5/2007 | Gasper et al. | 348/14.12 |
| 2007/0167204 A1 * | 7/2007 | Lyle et al. | 463/9 |
| 2008/0001951 A1 | 1/2008 | Marks et al. | |
| 2008/0091692 A1 * | 4/2008 | Keith et al. | 707/100 |
| 2008/0195699 A1 | 8/2008 | Min et al. | |
| 2008/0215973 A1 | 9/2008 | Zalewski et al. | |
| 2008/0215974 A1 | 9/2008 | Harrison et al. | |
| 2008/0215994 A1 | 9/2008 | Harrison et al. | |
| 2008/0284779 A1 | 11/2008 | Gu et al. | |
| 2008/0316227 A1 | 12/2008 | Fleury et al. | |

* cited by examiner

*Primary Examiner* — Edward Martello
(74) *Attorney, Agent, or Firm* — Lisa Ulrich, Esq.; Kevin P. Radigan, Esq.; Heslin Rothenberg Farley & Mesiti P.C.

(57) ABSTRACT

The rendering of avatars in a virtual universe is selectively controlled by the avatar owner. Avatar ranking by several criteria, operating either jointly or independently, is employed to control avatar rendering in ways intended to reduce computational loading while not significantly impacting the virtual universe experience.

17 Claims, 2 Drawing Sheets

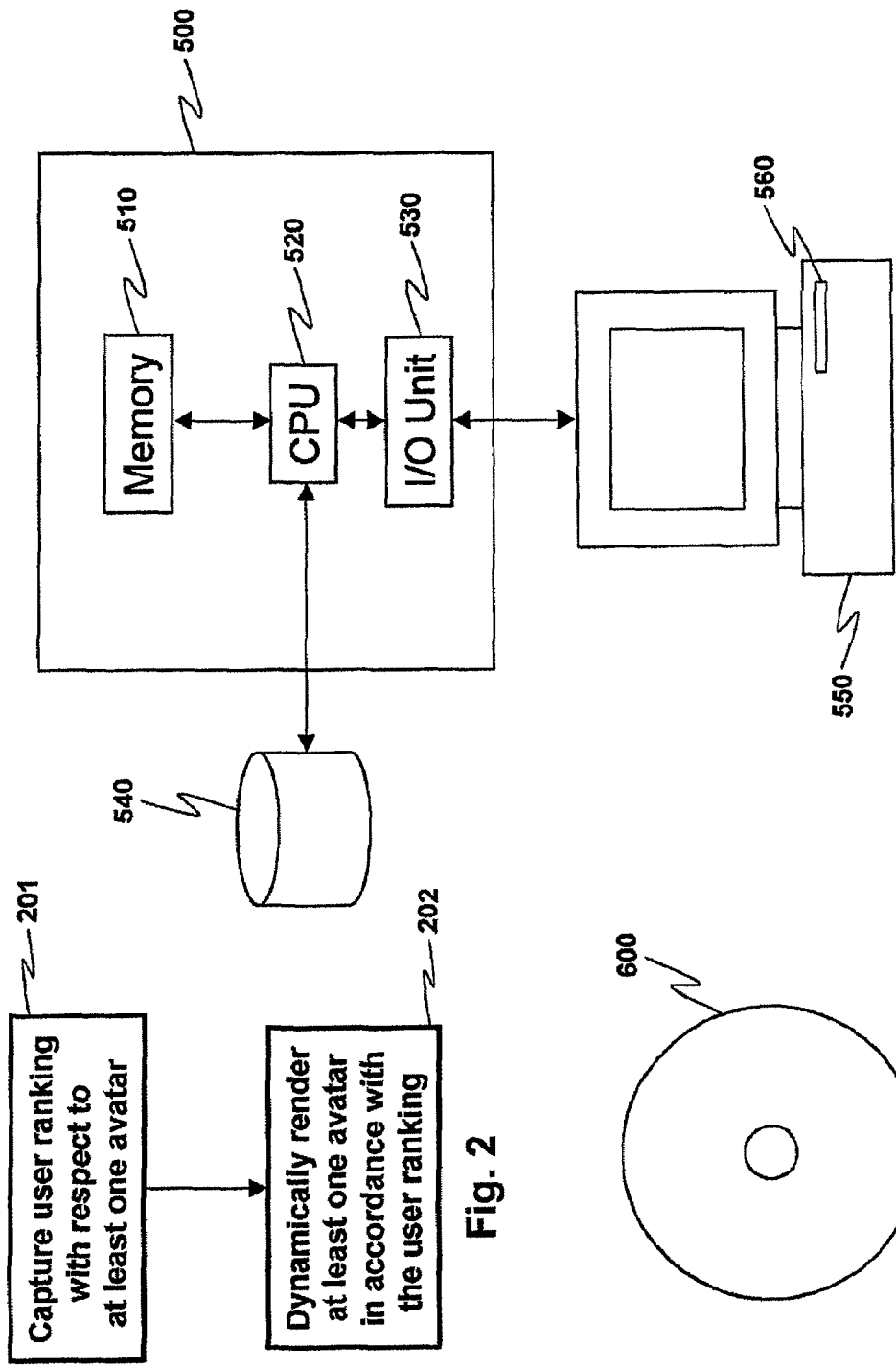

RENDERING AVATAR DETAILS

FIELD OF THE INVENTION

The present invention relates in general to virtual world program applications and more particularly, to methods and systems for controlling the rendering of avatars or other elements employed in these applications.

BACKGROUND OF THE INVENTION

A Virtual Universe (VU) is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet." Often, the VU resembles the real world such as in terms of physics, houses, and landscapes. Example VUs include: Second Life®, Entropia Universe®, The Sims Online™, There™, as well as massively multiplayer online games such as EverQuest®, Ultima Online™, Lineage™ or World of Warcraft®.

It should not be assumed that the utility of virtual worlds is limited to game playing, although that is certainly seen to be useful and valuable insofar as it has become a real economic reality with real dollars being exchanged. However, the usefulness of virtual worlds also includes the opportunity to run corporate conferences and seminars. It is also used to conduct virtual world classroom sessions. Governmental and instructional opportunities abound in the virtual world. Accordingly, it should be fully appreciated that the term "virtual" as applied to this technology does not in any way make it less real or less valuable than the "real" world. It is really an extension of current reality. Moreover, it is an extension that greatly facilitates human communication and interaction in a non-face-to-face fashion.

The prevalence of virtual world residence is demonstrated by the millions of accounts that have been registered with Second Life®. Virtual worlds are typically divided into areas of land (referred to as regions in Second Life® terminology). To account for the activity of Second Life® residents, many servers are employed to keep up with the growing user base. As activity on virtual items continues to grow, the client software will be required to render more and more graphical content at increasingly higher resolutions. In the current art, this graphical content is rendered in its entirety. Granular control does not exist over which avatars to render. It is noted that, as used herein, the term "resolution" refers to several avatar aspects ranging from the number of facets used to represent an avatar, to color and spatial resolution of textures mapped to the avatar body, to the granularity of the motion of avatar body parts, et cetera.

Second Life® and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new marketing methods and mechanisms.

SUMMARY OF THE INVENTION

The shortcomings of the prior art are overcome and additional advantages are provided through the construction and use of systems to reduce computational load on client VU systems when rendering complex VU scenes, through user (that is, manual) and automatic selection of the placement of graphical emphasis. Automatic selection is influenced by detection of avatar interactions, similar inventories, in-progress transactions, and company hierarchy. Here, "company" is used in the sense of which avatars are present in the same company of employment with the user's avatar.

The present invention enables virtual-universe clients to have granular (and selective) control during avatar rendering. There are two primary components or aspects to the present invention. These two components along with their subcomponents are described herein. The first component describes an avatar rendering ranking system having both manually and automated methods. The second component describes a system to reduce computational load created by a virtual universe client. The load reduction component describes several methods and modifications to a VU that result in reduced computational load.

In accordance with the present invention, there is provided a method for rendering avatars in a virtual universe environment by capturing user ranking with respect to various avatars and by dynamically rendering these avatars in accordance with this ranking.

Presently, methods do not exist to enable residents to reduce client computational load by ranking avatars, either manually or automatically. In accordance with the present invention, client computational load is reduced by either eliding, or reducing the rendering quality of avatars based on rankings.

Additional features and advantages are realized through the techniques of the present invention. Other embodiments and aspects of the invention are described in detail herein and are considered a part of the claimed invention. Furthermore, any of the components of the present invention can be deployed, managed, serviced, etc. by a service provider who offers to provide a mechanism for users of VU applications to selectively control the rendering of avatars and other aspects of the VU environment.

The shortcomings of the prior art are overcome and additional advantages are provided through the provision of a computer program product for rendering avatars in a virtual universe environment. The computer program product comprises a storage medium readable by a processing circuit and storing instructions for execution by a computer for performing a method.

Additional features and advantages are realized through the techniques of the present invention. Other embodiments and aspects of the invention are described in detail herein and are considered a part of the claimed invention. Methods and systems relating to one or more aspects of the present invention are also described and claimed herein. Furthermore, services relating to one or more aspects of the present invention are also described and may be claimed herein.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 2 is a block diagram showing the basic steps carried out in the practice of the present invention;

FIG. 3 is a block diagram illustrating a system which an end user typically employs to use the present invention; and FIG. 4 illustrates one form of machine readable medium, a CD-ROM, on which program instructions for carrying out the steps of the present invention are provided.

DETAILED DESCRIPTION OF THE INVENTION

Figure 1:
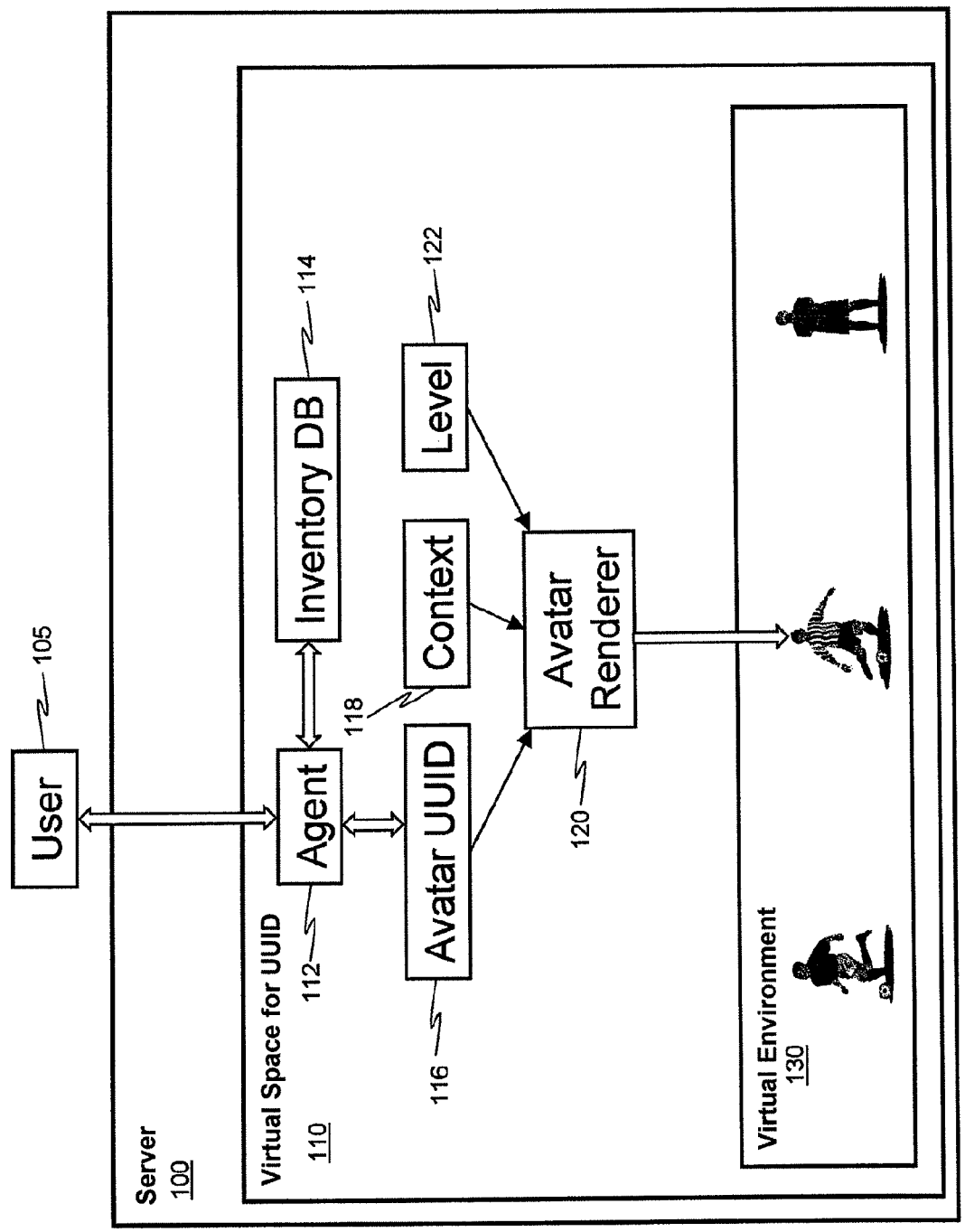
FIG. 1 is a block diagram illustrating the structural components of the present invention.

In order to better understand the present invention and the advantages that it produces, it is useful to provide descriptions of some of the VU concepts and terms that are encountered. The list below is exemplary and is not intended to be all inclusive.

(1) An avatar is a graphical representation a user selects that other users can see, often taking the form of a cartoon-like human but with increasing desire to render the depiction in more realistic fashion.

(2) An agent is the user's account, upon which the user can build an avatar, and which is tied to the inventory of assets a user owns.

(3) A region is a virtual area of land within the VU.

(4) Assets, avatars, the environment, and anything visual consists of UUIDs (unique identifiers) tied to geometric data (distributed to users as textual coordinates), textures (distributed to users as graphics files such as JPEG2000 files), and effects data (rendered by the user's client according to the user's preferences and user's device capabilities).

Note too that, throughout this disclosure, for clarity of presentation only, reference is made to an individual or avatar, which is a digital representative of the individual. However, it should be noted that this term not only applies to an individual, but to any computerized processes that may execute on behalf of the individual, using the same credentials and capabilities of the individual that owns/controls the process. In general, this embodies many forms, such as prescheduled, automatically running maintenance processes, system level processes (owned by the system administrator), etc. In all cases, this process is treated like an avatar, with the same inputs and outputs, regardless of whether the credentials come directly from an individual or from a computerized process acting in his or her stead.

FIG. 1 illustrates the basic structure of the present invention. In particular, server 100 is seen as providing support for virtual environment 130 which for practical limitations illustrates the presence of three avatars, one of which represents the current user owner. For purposes of understanding the present invention, it is best to consider the center figure as representing the user's avatar. The other figures will have their own UUID's, contexts and levels (not shown for reasons of clarity). Server 100 provides virtual environment 130 within virtual address space 110 which is allocated to the subject user. The subject user 105 acts through agent 112. Agent 112 has access to inventory database 114 which, among other things, includes a list of objects and properties for those objects owned by the user within the virtual environment. Address space 110 is associated with the subject user through avatar UUID 116. Address space 110 also includes avatar renderer 120. In accordance with the present invention, it is noted that avatar renderer 120 is not only provided with avatar UUID 116, but also with context and level information, 118 and 122 respectively, as described more particularly below.

As indicated above, there are two aspects of the present invention: avatar rendering and computational load reduction. The first of these components to be considered is avatar rendering. Furthermore, two distinct methods of determining avatar rendering importance are described: manual and automated. Both of these methods enable the client to reduce its computational load when rendering virtual universe regions.

Often, interactions between users within a VU are restricted to a small number of users. For example, avatar A is attending a virtual concert with avatar B. Both avatar A and B are friends. Avatar C is also attending the virtual concert. However, avatar C is not interested in what clothing avatar A and B are wearing, but only interested in his own friend, avatar D as well as the concert band. While the clothing of avatar A and B are not of interest to avatar C, in current art, the VU client renders all interactions which thus increases the computational load placed on the VU client.

In current art, methods do not exist for the convenient and selective reduction of computational load by modifying the rendering characteristics of avatars within a virtual universe. Nor do (manual or automatic) methods exist to select which avatar's rendering characteristics to modify. Previously unknown methods for the rendering or ranking of avatars include: avatar interaction based rankings, inventory similarity based rankings, detection of in progress business interactions and company hierarchy based rankings.

Manual

In the manual embodiment, a user is responsible for designating the relative rendering ranking of avatars.

A modification to a Virtual Universe client allows residents of that universe to denote other avatars' rendering importance. It is known for users of a virtual universe to be able to select objects within that universe. This is commonly done with an input device such as a mouse or a keyboard. Also known is for an input combination to display to the user a "context" menu for said selected object. The "context" menu commonly displays actions appropriate for the selected item. The present invention modifies the "context" menu of a virtual universe user interface adding an action to allow a ranking of rendering importance for each avatar. Those skilled in the art will note that many possible variations and combinations exist to select an object and to request an action be performed upon the object. Additionally, the selection of avatars and subsequent selection of rendering importance is applied simultaneously across multiple avatars within a visible region.

Embodiments of the present invention may differ in the number of distinct rendering importance levels or rankings. Exemplified herein is a sample embodiment that contains three levels. Level one denotes avatars to always render (and usually with high quality), level two consists of "normal avatars," and level three denotes "extraneous" avatars. The rendering ranking for each avatar is stored as metadata associated with the avatar UUID and is made to persist in a non-volatile database. On the other hand, the selections may be ephemeral, resetting over time or upon user log-off. In another embodiment, the user may choose an avatar's rendering ranking using the UUIDs of the avatars without the use of a graphical interface.

Automatic

In the automatic embodiment, the client software is responsible for designating the rendering importance of avatars, with little or no user guidance.

As in the manual method described above, distinct rendering importance levels exist for avatars within the virtual universe. It should be noted, that while it is impractical for the manual method to make use of a large number of levels, the automated methods provides more fine-grained rendering levels, or rankings, of other avatars within the VU.

Ranking Methods: The following ranking methods are exemplary in nature and many other potential ranking methods are possible without deviating from the scope of the present invention. The ranking methods are usable in combination with each other and each type of ranking may have greater or lesser influence on the ranking, depending on the embodiment.

Avatar Interactions: If two or more avatars are involved in a chat session, the avatars involved in the chat session may be assigned a higher rendering ranking when compared with other avatars. Additionally, other interactions such as waving or handing a virtual document to another avatar should result in those avatars having a higher rendering ranking. Interaction ranking may also contain a temporal component, such that, recent interactions are ranked higher than previous interactions.

Inventory Similarities: If avatars have overlapping inventory items, there is a potential for those avatars to be interested in each other and therefore should have a higher rendering ranking than those who contain divergent inventory items. The percentage of overlap may be a factor in determining rendering ranking based on inventory similarity. For example, those with a 75% overlapping inventory should be ranked higher than those with a 12% overlapping inventory.

Business Transaction Detection: If it is determined that an avatar is involved in a business transaction with another avatar, those avatars should receive a higher rendering ranking than other avatars. Business transaction detection is achievable through parsing chat text, location within a VU (a region zoned for business), or engagement of an intra-VU fund transaction. Transaction ranking may also contain a temporal component, such that recent interactions are ranked higher than less recent interactions. It is also noted that the present model and process provides the ability to prevent select advertisements from having their rendering quality overridden, such as those supplied from platinum or gold level sponsors. Such ads may, for example, appear on billboards within the VU.

Company Hierarchy: Some embodiments may have access to a company directory which contains the company hierarchy. In such embodiments, those within a user's management chain and within his group, department, line of business, or unit should be given a higher ranking than other avatars within the company.

It should be noted that the above methods, manual and automated, might be used independently or in conjunction with each other.

Computational Load Reduction

This component uses the rendering rankings computed by the Avatar Rendering Ranking Component to reduce computational load on the client.

Invocation: Several potential methods exist for invoking the computational load reduction component.

Manual Invocation: Manual invocation occurs at the request of the user who is typically in control of many aspects of the virtual universe (VU) client. For example, the user is using his PC that runs the VU client. The user may choose to engage the system application for any reason, including but not limited to: observation of system slowdown, preference for enhanced performance, the need to be undistracted by unimportant avatars, the need to find important avatars or avatars of interest, etc. System invocation may take many forms known in the art of user interface design. Some potential invocations methods include: selecting an icon, activation with a keyboard hot key, selection from a menu, voice instructions, mouse pointing, etc.

Constant Invocation/Manual Deactivation: Some embodiments may enable the load reduction system by default. In such embodiments the system is always engaged. Furthermore, a subset of these embodiments may provide the user with a manual deactivation method to disable the system Load-based invocation: More complex embodiments may engage the load reduction system by measuring the computational load on the client system. Such embodiments periodically poll the client system to obtain metrics describing the current system load. Load can include such factors as system memory usage, page faults, graphic memory usage and CPU statistics including run queue length, wait queue length, system queue length, etc. The previous are examples and many substitute metrics may be used without deviating from the core idea of the present invention. Note that predicted load and usage may be also be considered. For example, if usage trends indicate that in 15 minutes the VU will be very slow, engagement of the system may take place.

Load Reduction

Upon invocation, steps are taken to reduce the computational load on the client for rendering the virtual universe. Several example methods for reducing computational load are described below.

Polygon/Triangle Reduction: To reduce computational load on either the CPU (Central Processing Unit) or GPU (Graphical Processing Unit) the client may reduce the number of polygons required to render an avatar. In 3D rendering, polygons and triangles are the primitive objects which make up complex 3D objects such as avatars. Reducing the number of polygons and triangles for an avatar reduces the load on the system during the graphical rendering process called rasterisation. Rasterisation is well known in the art of 3D rendering and is the method used by virtually all current GPUs to create realistic images. Simple calculations may be performed in real time to reduce the number of polygons that are required for each animated frame within a virtual universe. These calculations replace many smaller polygons and triangles with larger such primitives. Reducing primitives results in a lower quality and less realistic rendering. It is also possible to use zero polygons and simply render the avatars as line segments.

Frame Rate Reduction: A second method to reduce load is to modify the frame rate for rendering individual avatars within a virtual universe. As with movies and television, smooth motion within a virtual universe is an illusion created by rapidly changing static images. Another term for these static images is rendered frames. Each avatar within each frame takes computational load to render. If the number of times an avatar was rendered per time period was reduced, the computational load would likewise be reduced. In such systems the last previously rendered avatar image would be cached and used for subsequent frames. Such a reduction may result in avatars having jerky movement throughout the virtual universe.

Texture/Lighting Elision: A third optimization method is the elimination of texturing mapping and lighting calculations for individual avatars within a virtual universe. Texture mapping is the process of applying a flat texture stored in image format to a three dimensional shape. Texture mapping is a computationally intensive process and eliminating this process reduces load on the client. Without textures, the avatars may be rendered in a "wireframe" format. Other embodiments may display avatars without textures as primitives (cones, cubes, tubes, etc) as solid textures. A second optimization that may be used with or without texture elision is to eliminate lighting calculations from avatar rendering. Lighting calculations are computationally intensive operations that modify the brightness, shading and other visual characteristics of an object by realistically simulating how light (directional and omnidirectional) affects an object. Removing lighting (and the time and resource consuming calculations associated therewith) results in less realistic avatar representations. The number of lighting sources are reduced or even eliminated as one method for controlling the requirements for controlling avatar rendition. Furthermore, while focus herein has been directed to reducing avatar detail, more generally it is directed also to methods for controlling avatar rendition.

Avatar Elision: Another optimization method is the elimination of an avatar which would otherwise be rendered within a scene. This method typically saves more computational resources than any previously described method.

It should be noted that the above methods are usable independently or in conjunction with each other. The combination of methods to use and the level of reduction within each method is dependent on the rankings provided by the previously described ranking component.

It is noted that aggregate ranking information is desirable for use by advertisers. Those avatars with a high rendering ranking may be candidates to have advertising information (logos, teleport invitations, etc) as part of their avatar rendering. While this disclosure focuses on avatars, the methods and systems of the present inventions are equally applicable to other rendered objects within a virtual universe.

In yet another embodiment, the present invention provides a business method that performs the process steps of the invention on a subscription, advertising, and/or fee basis. That is, a service provider, such as a Solution Integrator, offers to provide both manual and automatic avatar (or object) rendering under selective control of the user as to its use and the parameters employed to carry out avatar rendering. In this case, the service provider creates, maintains, supports, etc., a computer infrastructure that performs the process steps of the invention for one or more customers. In return, the service provider receives payment from the customer(s) under a subscription and/or fee agreement and/or the service provider receives payment from the sale of advertising content to one or more third parties.

FIG. 2 illustrate the two basic steps employed in the present invention: (step 201) capturing user ranking with respect to at least one avatar; and (step 202) dynamically rendering at least one avatar in accordance with the captured user ranking.

In any event an end user environment in which the present invention operates is shown in FIG. 3. The present invention operates through a data processing environment which effectively includes one or more of the computer elements shown in FIG. 3. While FIG. 3 is more suited for illustrating an end user environment, it is noted that a similar, albeit typically much larger, data processing system is connected via the Internet to the local environment depicted. In particular, a similar non-volatile memory 540 is typically present at the server end to contain program instructions for carrying out the virtual reality program which are loaded into a corresponding main memory 510 for execution. Turning to a local focus, computer 500 includes central processing unit (CPU) 520 which accesses programs and data stored within random access memory 510. Memory 510 is typically volatile in nature and accordingly such systems are provided with non-volatile memory typically in the form of rotatable magnetic memory 540. While memory 540 is preferably a nonvolatile magnetic device, other media may be employed. CPU 530 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein device 560 for reading medium of one or more types such as CD-ROM 600 shown in FIG. 4. Media 600, an example of which is shown in FIG. 4, comprises any convenient device including, but not limited to, magnetic media, optical storage devices and chips such as flash memory devices or so-called thumb drives. Disk 600 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for rendering avatars in a virtual universe environment, said method comprising:
    capturing user ranking of at least one avatar, the user ranking indicating a level of importance in graphically rendering the at least one avatar for a user of the virtual universe environment, the level of importance being indicative of a rendering quality at which the at least one avatar is to be graphically rendered, and the user ranking being selected automatically based at least partially upon interaction between the at least one avatar and another avatar within the virtual universe environment, wherein the user ranking is specific to graphically rendering the at least one avatar for that user and is distinct from user ranking for graphically rendering the at least one avatar for another user of the virtual universe environment, wherein the user ranking incorporates a temporal consideration in which user ranking for the at least one avatar decreases over a duration of time based on time since last interaction with the another avatar, wherein the at least on avatar is graphically rendered over the duration of time and the user ranking of the at least on avatar decreases, and the at least one avatar is rendered in lower quality, over the duration of time; and
    dynamically rendering, by a processor, said at least one avatar in accordance with said user ranking.

2. The method of claim 1 in which said ranking is selected automatically based further upon a hierarchical status of the user within a hierarchy of a company of employment of the user, wherein ranking of avatars of individuals within a same group of the company, department of the company, line of business of the company, or unit of the company as the user is higher than ranking of avatars of other individuals in the company.

3. The method of claim 1 in which said capturing is carried out both from ranking selection provided directly by an avatar owner and indirectly from ranking influencing data provided by said owner.

4. The method of claim 3 in which said ranking influencing data is selected from the group consisting of avatar interaction, business transaction and company hierarchy.

5. The method of claim 1, wherein computational load on the system is measured periodically and the dynamically rendering is invoked automatically based on the periodic measurement of the computational load.

6. The method of claim 5, wherein the dynamically rendering is invoked automatically based on trend in usage of the virtual universe environment client on the system indicating that a speed of execution of the virtual universe environment client after a predetermined a mount of time is predicted to be undesirably slow.

7. The method of claim 1 in which said rendering in accordance with the user ranking comprises at least one of: reducing a number of polygons used to render said at least one avatar, reducing frame rate for said at least one avatar, eliminating at least a portion of texture mapping applied to said at least one avatar, employing flat textures, displaying said at least one avatar in wireframe format, or displaying said at least one avatar without one or more light sources being present.

8. The method of claim 1 in which said rendering in accordance with the user ranking comprises eliding said at least one avatar which would otherwise be rendered within a scene, wherein the eliding entirely eliminates the at least one avatar from being rendered within the scene.

9. The method of claim 1, wherein the dynamically rendering is activated in response to at least on of: observation of system slowdown, preference for enhanced performance, a need to be undistracted by unimportant avatars, a desire to find important avatars, or desire to find avatars of interest.

10. The method of claim 1, wherein the dynamically rendering is activated manually by a user via at least one of: selection of an icon, or selection from a menu.

11. The method claim 1, wherein the dynamically rendering is activated manually by a user via at least one of: activating keyboard hot key, or voice instructions from the user.

12. The method of claim 1, wherein based on the at least one avatar having a higher user ranking relative to user ranking of other avatars, the dynamically rendering the at least one avatar comprises providing advertising information as part of the dynamic rendering of the at least one avatar.

13. The method of claim 1, wherein the interaction comprises one or more of: the at least one avatar waving at the another avatar in the virtual universe environment, or the another avatar waving at the at least one avatar in the virtual universe environment.

14. The method of claim 1. wherein the interaction comprises involvement of the at least one avatar and the another avatar in a business transaction with each other, and wherein the method further comprises:
  detecting the involvement of the at least one avatar and the another avatar in the business transaction, wherein the detecting is based on at least one of: parsing chat text, presence of the at least one avatar or the another avatar within a region of the virtual universe environment zoned for business transactions, and engagement between the at least one avatar and the another avatar in an intra-virtual universe environment fund transaction.

15. The method of claim 1, wherein the at least one avatar comprises multiple avatars graphically rendered within a visible region of the virtual universe environment, wherein based on user input from a pointing device, the graphically rendered multiple avatars are selected within the visible region, and the user ranking is simultaneously applied to graphically rendered multiple avatars within the visible region.

16. A computer program product for rendering avatars in a virtual universe, the computer program product comprising:
  a non-transitory storage medium readable by a processor and storing instructions for execution by the processor to perform:
    capturing user ranking of at least one avatar, the user ranking indicating a level of importance in graphically rendering the at least one avatar for a user of the virtual universe environment, the lever of importance being indicative of a rendering quality at which the at least one avatar is to be graphically rendered, and the user ranking being selected automatically based at least partially upon interaction between the at least one avatar and another avatar within the virtual universe environment, wherein the user ranking is specific to graphically rendering the at least one avatar for that user and is distinct from user ranking for graphically rendering the at least one avatar for another user of the virtual universe environment, wherein the user ranking incorporates a temporal consideration in which user ranking for the at least one avatar decreases over a duration of time based on time since last interaction with another avatar, wherein the at least one avatar is graphically rendered over the duration of time and the user ranking of the at least one avatar decreases, and the at least one avatar is rendered in lower quality, over the duration of time; and
    dynamically rendering said at least one avatar in accordance with said user ranking.

17. A data processing system comprising:
a memory; and
a processor in communications with the memory, wherein the data processing system is configured to perform a method that includes:
  capturing user ranking of at least one avatar, the user ranking indicating a level of importance in graphically rendering the at least one avatar for a user of the virtual universe environment, the level of importance being indicative of a rendering quality at which the at least one avatar is to be graphically rendered, and the user ranking being selected automatically based at least partially upon interaction between the at least one avatar and another avatar within the virtual universe environment, wherein the user ranking is specific to graphically rendering the at least one avatar for that user and is distinct from user ranking for graphically rendering the at least one avatar for another user of the virtual universe environment, wherein the user ranking incorporates a temporal consideration in which user ranking for the at least one avatar decreases over a duration of time based on time since last interaction with the another avatar, wherein the at least one avatar is graphically rendered over the duration of time and the user ranking of the at least one avatar decreases, and the at least one avatar is rendered in lower quality, over the duration of time; and
  dynamically rendering said at least one avatar in accordance with said user ranking.

* * * * *